United States Patent [19]
Lindauer et al.

[11] Patent Number: 5,337,405
[45] Date of Patent: Aug. 9, 1994

[54] GUIDED DATA PRESENTATION

[75] Inventors: James M. Lindauer, San Francisco; Richard D. Pering, Palo Alto, both of Calif.

[73] Assignee: Hewlett-Packard Company, Palo Alto, Calif.

[21] Appl. No.: 591,591

[22] Filed: Oct. 2, 1990

[51] Int. Cl.⁵ ............................................... G06F 3/14
[52] U.S. Cl. ..................... 395/147; 395/155; 395/159
[58] Field of Search ............... 395/147, 148, 149, 145, 395/157; 364/550, 188, 155, 161, 551.01

[56] References Cited

U.S. PATENT DOCUMENTS 5,155,806  10/1992  Hoeber et al. ........................ 395/157

OTHER PUBLICATIONS

"Lucid 3-D (Tutorial Guide)", 1987, Chpt. 3 pp. 3-7, Personal Support Group, Inc.

Microsoft Corporation, "Microsoft Windows User Guide", 1987, Chptr. 2 pp. 16 and 17.

*Primary Examiner*—Gary V. Harkcom
*Assistant Examiner*—Michael Smith

[57] ABSTRACT

A computer system comprises a computer, a monitor, a keyboard, a mouse, and an instrumentation system. The instrumentation system is coupled to a patient to gather data about a patient over time. The data is arranged in a flowsheet, only a portion of which can be displayed at one time. Indicators are used to indicate the presence of data off-display meeting a preselected criterion. This criterion can be the existence of a value entry or the existence of a value entry exceeding a threshold, for example. Upon activation of an indicator, the display scrolls to the next flowsheet neighborhood containing an entry meeting the criterion. In this way, a physician or other operator can navigate efficiently and rapidly through a large flowsheet. The invention allows an operator to skip large quantities of empty cells and uninteresting data when the flowsheet is sparsely filled.

18 Claims, 7 Drawing Sheets

| Time | 0:30 | 0:45 | 1:00 | 1:10 | 1:30 | 1:45 | 2:00 | 2:30 | 3:00 | 4:00 | 5:15 | 6:30 | 6:45 | 7:00 | 7:30 | 7:45 | 8:00 | 8:30 | 9:45 |
|---|---|---|---|---|---|---|---|---|---|---|---|---|---|---|---|---|---|---|---|
| Pulse | 72 | 74 | | | | | | | | | | | | 70 | | | 74 | | 72 |
| Urine, HEM | 9.0 | | 9.2 | | | 9.2 | | | | | | 8.8 | | | | | | | 9.1 |
| Urine, PROT. | | | | 1.6 | | | | 1.6 | | | | | | | | | | | 1.5 |
| PaCO2 | | | 41 | 39 | 41 | | | | | | | | | | | | | | |
| HCO3 | | | | | | | | | | 24.7 | | | | | 26.9 | | | 26.1 | |
| FiO2 | | | | | | | | | | | | | | | | | | | |
| PaO2 | | | | | | | | | | | | | | | | | | | |
| SaO2 | 97.8 | | 98.0 | | | 97.9 | | | | 98.1 | | | | | | | 98.0 | | |
| Hb | | | | | | | | | | | | | | | | | | | |

| | | 2:30 | 3:00 | 4:00 | 5:15 | 6:30 | |
|---|---|---|---|---|---|---|---|
| Urine, PROT. | ◀ | 1.6 | | | | | ▶ |
| PaCO2 | ◀ | | | | | | |
| HCO3 | | | | 24.7 | | | ▶ |
| FiO2 | | | | | | | |
| PaO2 | | | | | | | |
| Hb | | | | | | | |

Figure 4B

| | | 7:30 | 7:45 | 8:00 | 8:30 | 9:45 | |
|---|---|---|---|---|---|---|---|
| Urine, PROT. | ◀ | | | | | 1.5 | |
| PaCO2 | ◀ | | | | | | |
| HCO3 | ◀ | 26.9 | | 26.1 | | | |
| FiO2 | | | | | | | |
| PaO2 | | | | | | | |
| Hb | | | | | | | |

GUIDED DATA PRESENTATION

BACKGROUND OF THE INVENTION

The present invention relates to data storage and presentation, and more particularly, to a system and method for presenting electronically stored data in tabular form, as in spreadsheets and flowsheets. A major objective is to improve presentation and review of time-varying medical data.

Electronic storage and presentation of data have improved many aspects of modern life, including medicine, by facilitating data review and manipulation. Efficient data accessibility contributes to accurate diagnosis and monitoring, and aids in treatment. Compilation of data about patient conditions also contributes to medical research and can provide information leading to breakthroughs in treatment and cures of diseases.

Information about a patient is commonly entered on a flowsheet consisting of a collection of times (independent variables) with an associated set of measurements (dependent variables) arranged in a matrix. By comparing earlier readings with later readings, changes in the patient's condition can be monitored. A matrix of data relating to a patient's physical condition can consist of a few data entries in a largely empty matrix. Alternatively, the matrix may be full, but the user may be interested in reviewing only certain measurements. For example, when a patient enters a hospital for diagnosis or treatment, information is commonly gathered relating to blood pressure, heart rate, or blood constituents such as blood sugar, oxygen, carbon dioxide, or hemoglobin. If the physician is primarily interested in abnormal blood oxygen concentrations over time, he may wish to review only the cells containing abnormal values.

Most institutions keep patient records on paper. The practitioner can spread the records out in front of him for easy review, and can juxtapose pages to compare data. Pages can be reordered to highlight data of interest. On the other hand, under clinical conditions, the practitioner is often not able to spread the records out, and ends up flipping through a file. The file may be cumbersome, and paging back and forth can be clumsy and lead to error. Furthermore, review of paper records can take a significant amount of time.

Electronic record-keeping obviates many of the problems associated with paper records. Electronic records remain in order, allowing for quick and easy review of sequential entries. Large amounts of data can be stored and quickly searched. On the other hand, electronic data are usually presented in matrices on a cathode-ray tube (CRT) screen, so that only a single screenful, or "neighborhood", of data, can be displayed at a given time. The user must scroll back and forth to review entries in different data neighborhoods. Furthermore, although a system will often allow a user to view and compare data items that happen to be nearby in the matrix, conventional approaches do not allow the user to compare significant data items that are not nearby. The advantage of juxtaposition, allowed by paper records, can be lost in electronic presentation.

When matrix data are sparse, review of the data can involve scrolling through screen after screen of empty cells. For example, in a compilation of fields arranged by time, even if only the first and last time slots contain data entries, the user must typically check all time slots. Review of the data entries can require that the user scroll through many empty screens to glean a few entries. The repetitive scrolling can lead to fatigue and increased errors.

Successive frames on the CRT may overlap, so that presentation is redundant. When successive frames do not overlap it is often unclear whether a salient data entry has been skipped over. The neighborhood of values presented often provides insufficient context for the user. Such inconvenient presentation of data may be a further cause of fatigue and error.

Although conventional display techniques can indicate that there are cells beyond the neighborhood presented, the user has no way of knowing whether the cells are empty or whether they contain data and, if so, whether they contain data of interest. The user must scroll through an entire flowsheet to be sure that he has not overlooked any data entries. When the data in the matrix is sparse, review of empty neighborhood after empty neighborhood can be tedious and frustrating. What is needed is a method of data storage and display that enables a user to monitor data items of interest quickly and easily without fatiguing and repetitious scrolling, and that allows comparison of data entries of interest in databases, spreadsheets, and flowsheets.

SUMMARY OF THE INVENTION

In accordance with the present invention, a method of electronic data display indicates whether there are significant off-display data entries in a flowsheet. The flowsheet can be ordered according to time or another independent variable. The data entries can be values of a dependent variable which vary as a function of the independent variable. A criterion is defined for evaluating the values of the dependent variable. A display range of the flowsheet is selected for display. An off-display array of flowsheet entries is selected for evaluation. The values of the dependent variable corresponding to the off-display array of the independent variable are then evaluated to determine whether any corresponding values meet the criterion. If the criterion is met, an indicator is displayed to indicate the presence of those values. Preferably, activation of the indicator causes a new display range to be displayed, including the closest dependent variable value meeting the criterion.

A data display system in accordance with the present invention comprises a data processor, a data display means, and indicators capable of indicating the existence in storage off-display of data meeting a selected criterion. The data processor stores a flowsheet and evaluates data values in the flowsheet to determine whether they meet the criterion. When off-display values in the flowsheet meet the criterion, indicators indicate that the data are present, and, preferably, indicate the direction to scroll to bring the values on-display. More than one criterion can be used for evaluation, and the indicators can indicate the presence and direction of values meeting different criteria. Each indicator is preferably provided as a cell that contains an arrow pointing in the direction of off-screen values when there are off-screen values meeting the criterion, and that is empty (blank) when there are no off-screen values meeting the criterion.

The indicators can be activated by keyboard or, alternatively, by mouse device. Activating an indicator serves to display the next value that meets the criterion. By repeating the activation, the user can jump from one data entry to the next without scanning through a nearly empty flowsheet.

The indicator columns can inform the user whether all off-display cells of the matrix are empty or whether any contain data. In accordance with the method, off-display data are treated as one or more arrays of data for evaluation. Criteria for evaluation can include next and prior values of a variable; the presence or absence of data values that fall within or without a defined range; the existence or non-existence of data in off-display portions of the flowsheet; and whether there are any data values falling within a predetermined range for evaluation. On-display values can be used in the evaluation of off-display values.

The criterion can be other than the existence of data. The system can define a numerical criterion for evaluation of the data. If the user activates an indicator indicating the direction of the nearest data value meeting the criterion, that nearest value will be displayed. The system can thus allow the user to navigate rapidly from one data item of interest to the next even in a densely filled matrix. This quick navigation combines the advantages of comparison and juxtaposition provided by paper records with the convenience, speed, and security of electronic records.

The present invention flexibly provides for navigating a flowsheet of information more quickly than previous systems. Since the system moves directly to data meeting the criterion, the user avoids tedious scanning of screens of data of no interest to him. User fatigue and consequent errors can thus be reduced. These and other features and advantages of the present invention are apparent from the description below with reference to the following drawings.

BRIEF DESCRIPTION OF THE DRAWINGS

FIG. 3 is a flowsheet for presentation in accordance with the present invention.

FIGS. 4A and 4B are illustrations of display screens displaying portions of the flowsheet of FIG. 3, including indicators, on the system of FIG. 1.

DESCRIPTION OF THE PREFERRED EMBODIMENTS

Figure 1:
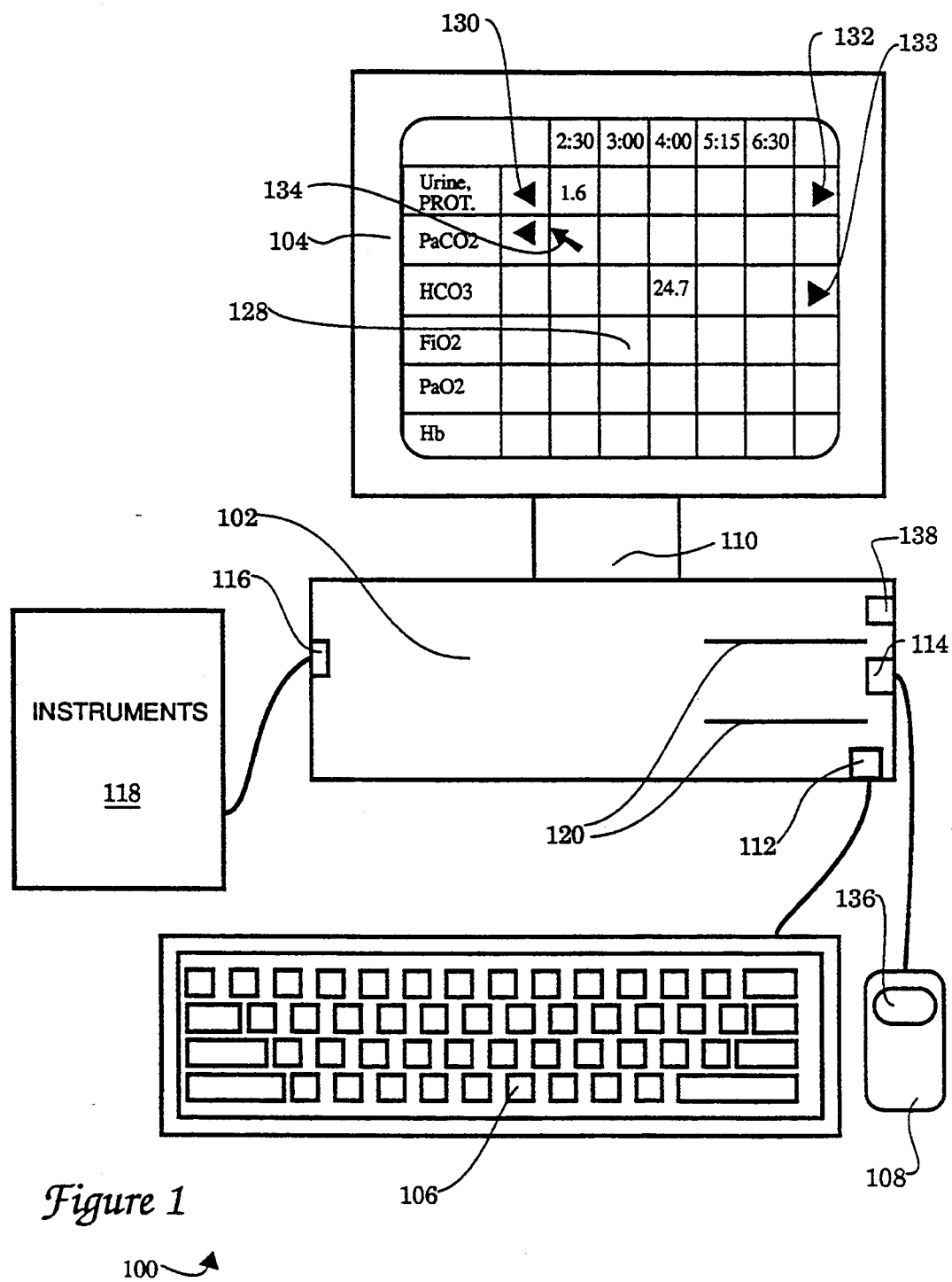
FIG. 1 is a schematic depiction of a data processing system in accordance with the present invention.
Figure 2:
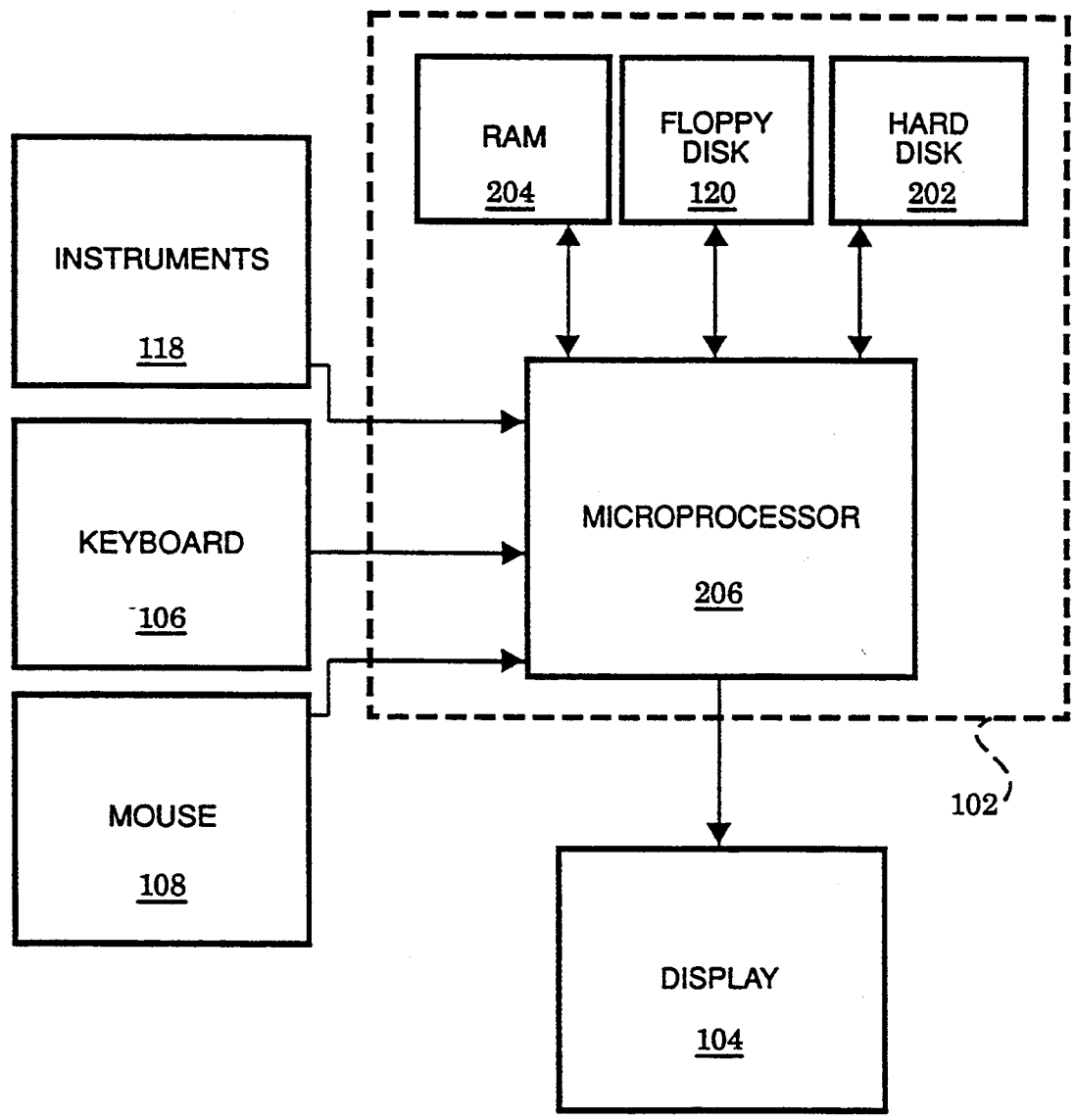
FIG. 2 is a block diagram of the system of FIG. 1.

A computer system 100 embodying the present invention comprises a computer 102, a monitor 104, a keyboard 106 and a mouse 108, as shown in FIGS. 1 and 2. Computer 102 is designed for storing and processing data and, accordingly, includes a hard disk 202 for long term data storage, random access memory (RAM) 204 for short term data storage, and a microprocessor 206 for processing data. Computer 102 includes a monitor port 110 for transmitting display signals to monitor 104, a keyboard port 112 for receiving inputs from keyboard 106, and a mouse port 114 for receiving inputs from mouse 108. In addition, computer 102 includes an instrumentation port 116 for communication with an instrumentation system 118 and a printer port 138 for communication with a printer device. Floppy disks 120 can be used for inputting data into and storing data from computer 102.

The data collected about a patient by instrumentation system 118 is transmitted to microprocessor 206 via instrumentation port 116. A database program executed by microprocessor 206 arranges data from instrumentation system 118 and keyboard 106 in a database stored on hard disk 202, as appropriate. Commands input using keyboard 106 and mouse 108 are used to invoke the database program to enable review of stored data. When so commanded, microprocessor 206 accesses hard disk 202 causing a selected portion of the database to be transferred to RAM 204 and displayed on monitor 104 in the form of a flowsheet display 128.

FIG. 1 illustrates the display and activation of the indicators. In addition to data, monitor 104 displays indicators 130 and 132. These indicators indicate the presence of "interesting" data which are not being displayed. Mouse 108 can be used to position a cursor 134 over either of the indicators. For example, indicator 130 shows that there is a prior value for the variable Urine, PROT. Similarly, indicators 132 and 133 show that there are later values for Urine, PROT. and $HCO_3$. When mouse 108 is moved so that cursor 134 is over left-facing indicator 130, pressing mouse button 136 causes flowsheet display 128 to be scrolled to the left to the point where the immediately prior data value that meets the criterion is displayed. When mouse 108 is moved so that cursor 134 is over right-facing indicator 132, pressing mouse button 136 causes flowsheet 128 to be scrolled to the right to a point where the next value meeting the criterion is displayed. Thus, indicators 130 and 132 can be used to scroll rapidly through data display 128, bypassing irrelevant portions of a flowsheet.

As indicated in FIG. 3, the data are arranged in a flowsheet 300, which is a spreadsheet in which data are arranged chronologically by sample time. In flowsheet 300, time is the ordering variable, i.e., the variable used to determine the order in which values of dependent variables are presented. Thus "prior" means earlier and "next" means later. The dependent variables are labeled in a leftmost variable label column 302, whereas time is indicated in a topmost row 304. Each displayed dependent variable value is located in a cell at the intersection of the row corresponding to the respective dependent variable and the column representing the time at which the value was measured. Monitor 104 permits a maximum of five columns and six rows of data values to be represented at once.

Flowsheet 300 includes more data than can be conveniently displayed on monitor 104 at any given time. Therefore, data must be scrolled into and out of monitor 104 so that all data can be viewed. Neighborhoods 306 and 308 respectively include columns of flowsheet 300 for which data can be displayed on monitor 104 at one time. FIGS. 4A and 4B each show a frame 404 and a data field 406. In FIG. 4A neighborhood 306 of flowsheet 300 is displayed at data field 406, while FIG. 4B shows neighborhood 308 being displayed in data field 406.

Frame 404 includes a field label column 408, a "prior" indicator column 410, a "next" indicator column 412, and an independent variable label row 414. Data field 406 contains five columns 421–425 representing five data collection times as indicated in independent variable label row 414. Rows 431–436 correspond to values of the independent variable corresponding to the field name listed in field label column 408. Accordingly, a data value in a cell at the intersection of a column and row represents the value of the dependent variable corresponding to the row taken at the time indicated in the cell in the topmost row and in the same column. For example, the value of dependent variable Urine, PROT. at time 2:30 is 1.6.

The database program permits the user to select which dependent variables are to be displayed on monitor 104. Lateral scrolling causes the times represented in topmost row 414, and correspondingly, the data displayed in data field 406, to change. Lateral scrolling does not affect the contents of dependent variable label column 408, but may change the contents of indicator columns 410 and 412 as described below. Provision is made for vertical scrolling to move amongst more dependent variables than can be displayed at once on monitor 104.

The preferred embodiment includes the procedures described below in pseudocode with reference to FIGS. 3, 4A, 4B, and 5. Comments to the pseudocode are in italics. The system defines an ordered set, or array, S of dependent variables. Throughout the following, the union of all times at which any variable in array S has a value is defined as array $T_S$. Values are displayed only for times in array $T_S$.

For purposes of the following discussion and pseudocode, there are number_of_vars variables, whose names are stored as the values $N_S[1]$ through $N_S$[number_of_vars] of an array $N_S$. The union of times at which one or more variables of S has a value is contained in the array $T_S[0]$ through $T_S$[number_of_times-1].

The rules for querying the flowsheet for the existence of values are defined by the following functions shown in pseudocode:

return_pointer:=exist_at(S[r], time)

This means that for the element of the array S determined by the row variable, the function will return a pointer to the value that exists at the time variable, or a null pointer if no value exists at time.

return_pointer:=exist_after(S[r], time, return_time)

This means that for the element of the array S determined by the row variable r, the function will return a pointer to the value that exists immediately after the time variable, or a null pointer if no value exists after time. It also returns the associated time, in return_time.

return_pointer:=exist_before(S[r], time, return_time)

This means that for the element of the array S determined by the row variable r, the function will return a pointer to the value that exists immediately before the time variable, or a null pointer if no value exists before time.

Figure 5:
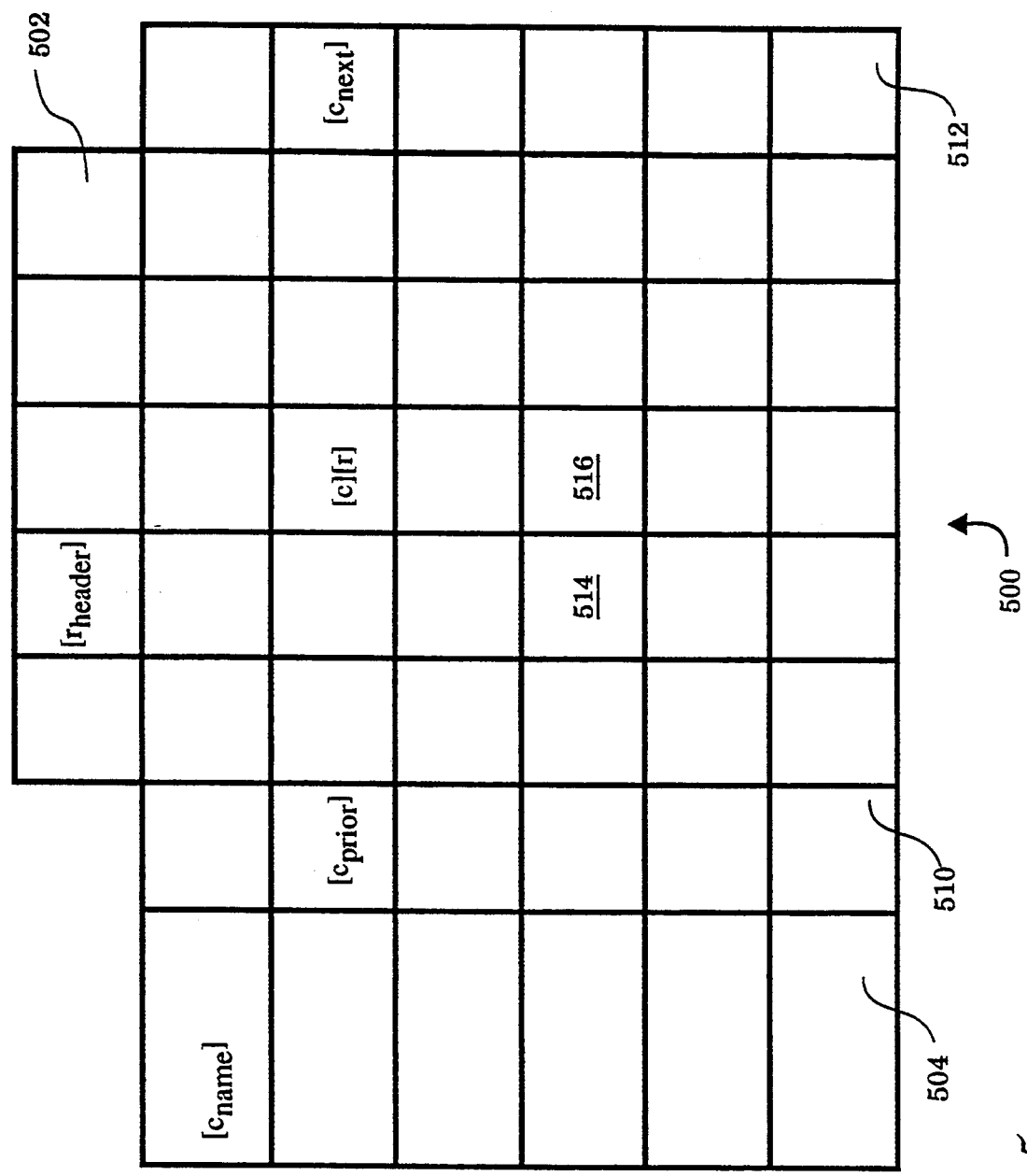
FIG. 5 is an illustration of a display screen with cells labeled to illustrate pseudocode terminology.

Illustrating the terms used in the following pseudocode, FIG. 5 shows a display matrix 500 of cells comprising several rows, indexed by r, and several columns, indexed by c. The notation "cell [c][r]" denotes the intersection of column c and row r. There are number_of_vars+1 rows. A topmost row 502 ($[r_{header}]$) displays the headers for each column, which in this example are various times.

The number of values of the independent variable that can be shown simultaneously is defined as number_of_cols columns. The screen in FIG. 5 shows number_of_cols +3 columns. A leftmost column 504 is defined as [$c_{name}$], and displays the names of the dependent variables of interest to the user. A column 510 is [$c_{prior}$], an indicator column that can display leftward-pointing arrows, as shown at 410. A column 512 is [$c_{next}$], an indicator column that can display rightward-pointing arrows, as shown at 412. Cells in columns 0 through number_of_cols-1, as for example cells 514 and 516, display values for the dependent variables named at the times indicated. The notation cell[c][r]:=V means that the procedure loads the value V into position [c][r] of the display. This convention allows the pseudocode to suppress details involved in managing the display.

The first procedure is to create a default display from the chosen array of dependent variables. The display can be initialized by redisplay(0,0)

which starts with a display of values from the earliest times and the first variables in the array S.

The following procedure does most of the work:

```
procedure redisplay(left, top)
  begin (* redisplay *)
    (* Adjust row and column stops if necessary *)
    right := left + number_of_cols − 1;
    if (right ≧ number_of_times)
    then
        right := number_of_times − 1;
        left := right − number_of_cols + 1;
    endif;
    bottom := top + number_of_lines − 1;
    if (bottom ≧ number_of_vars)
    then
        bottom:= number_of_vars − 1;
        top := bottom − number_of_lines + 1;
    endif:
    (* Fill in the time values for column headers *)
    foreach c from left to right
        cell[c−left][r_header] := T_S[c];
    end; (*foreach c*)
    (* Fill in row elements for visible rows *)
    prior_time := T_S[left];
    next_time := T_S[right];
    foreach r from top to bottom
        (* Set prior_button for row *)
        cell[c_name][r − top] := S[r];
        if ((return_pointer := exist_before (S[r], prior_time, return_time))
                is not null)
        then
            (* Display left arrow in prior button column *)
            cell[c_prior][r] := left_arrow
        else
            cell[c_prior][r] := blank;
        endif;
        (* Set next_button for row *)
        if ((return_pointer := exist_after (S[r], next_time, return_time))
                is not null)
        then
            (* Display right arrow in next button column *)
            cell[c_next][r] := right_arrow
        else
            cell[c_next][r] := blank;
        endif;
        (* Fill in any values for row *)
        foreach c from left to right
            if ((return_pointer := exist_at (S[r], T_S[c])) is not null)
            then
                (* return value at queried time *)
                cell[c−left][r] := value at return_pointer
            else (* return blank *)
```

```
         cell[c—left][r] := blank;
      endif;
   end; (* foreach c *)
end; (* foreach r *)
end; (* redisplay *)
```

When the mouse device is activated to select a cell either in the "next" column or in the "prior" column, at the user's option, the action associated with that cell will be carried out. If the cell contains a left arrow, procedure scroll_back will be invoked. If the cell contains a fight arrow, procedure scroll_ahead will be invoked. Nothing occurs in the case of an empty cell.

FIG. 4A shows an initial display of data segment 306 of flowsheet 300. If the data displayed as in FIG. 4A are put through the procedure for scroll$_{13}$ahead by activating the "next" indicator for variable Urine, PROT., a display as shown in FIG. 4B will result. The display in FIG. 4B corresponds to data segment 308 of flowsheet 300.

The procedure is described in the following pseudocode:

```
function index (return-time);
(* Returns the index where return-time occurs *)
   begin (* return_index *)
      foreach element for 0 to number_of_times
         if (return_time = T_S[element])
            then return (element);
         end (* foreach element *)
      end (* return_index *)
procedure scroll_ahead(r, top)
      begin (* scroll_ahead *)
         return_pointer := exist_after (S[r], T_S[right],
return_time);
         right := index (return_time);
         left := right — number_of_columns + 1;
         redisplay(left, top);
      end; (* scroll_ahead *)
```

The procedure for scroll_back is described in the following pseudocode:

```
procedure scroll_back(r, top)
      begin (* scroll_back *)
         return_pointer := exist_before (S[r], T_S[left],
return_time);
         left := index (return_time);
         redisplay(left, top);
      end; (* scroll_back *)
```

Figure 6:
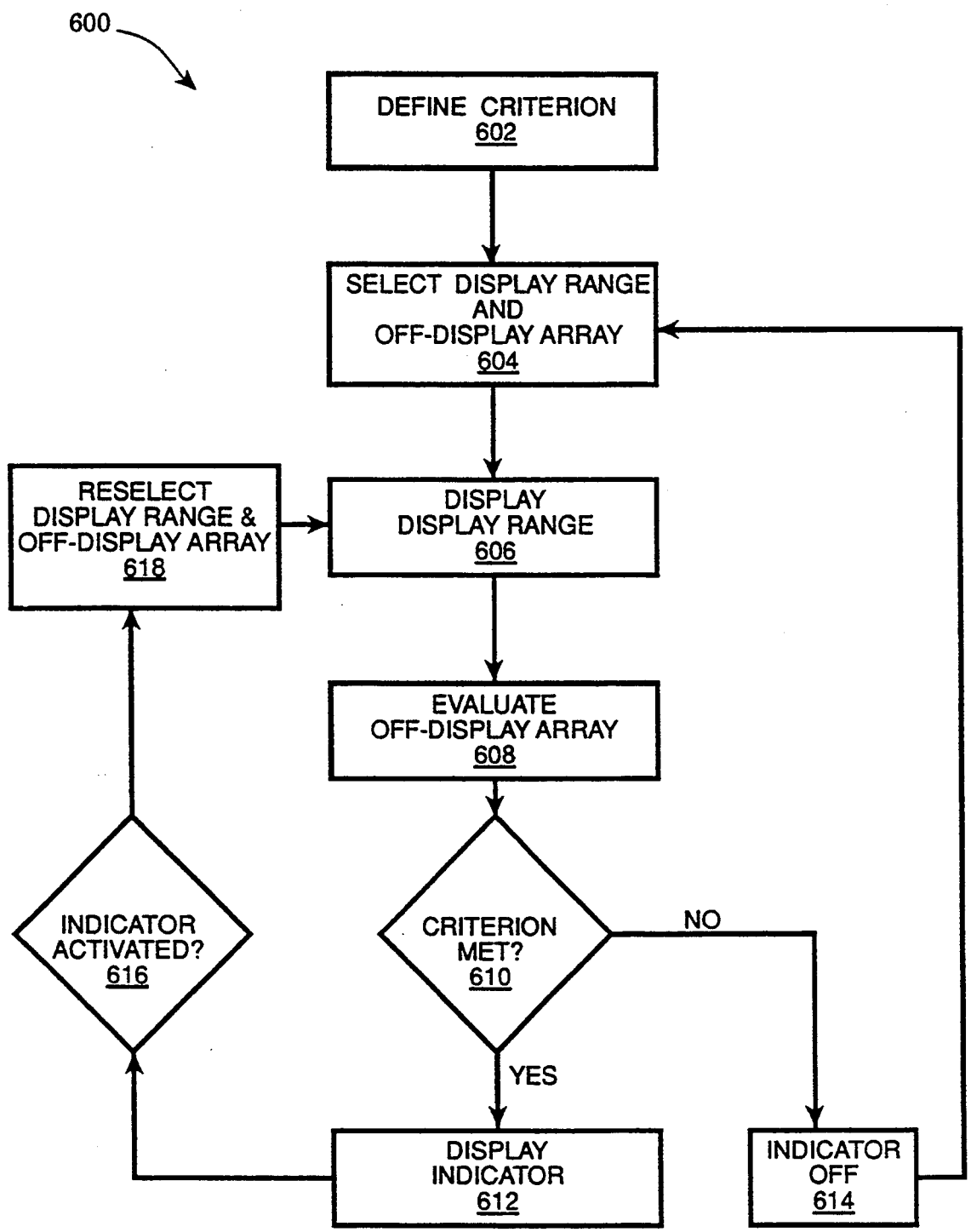
FIG. 6 is a flow chart of a method of the present invention using the system of FIG. 1.

In accordance with method 600 of the invention, as shown in FIG. 6, a criterion for evaluation of values of a dependent variable is defined, at step 602. A display range and an off-display array of values of the independent variable are selected, at 604. The values in the first display range are displayed, at 606. The values of the dependent variable corresponding to the first off-display array of the independent variable are evaluated, at step 608. If the criterion is met, as indicated at 610, the corresponding indicator is displayed, at 612. Otherwise, the indicator is not displayed, as indicated at 614.

Figure 7:
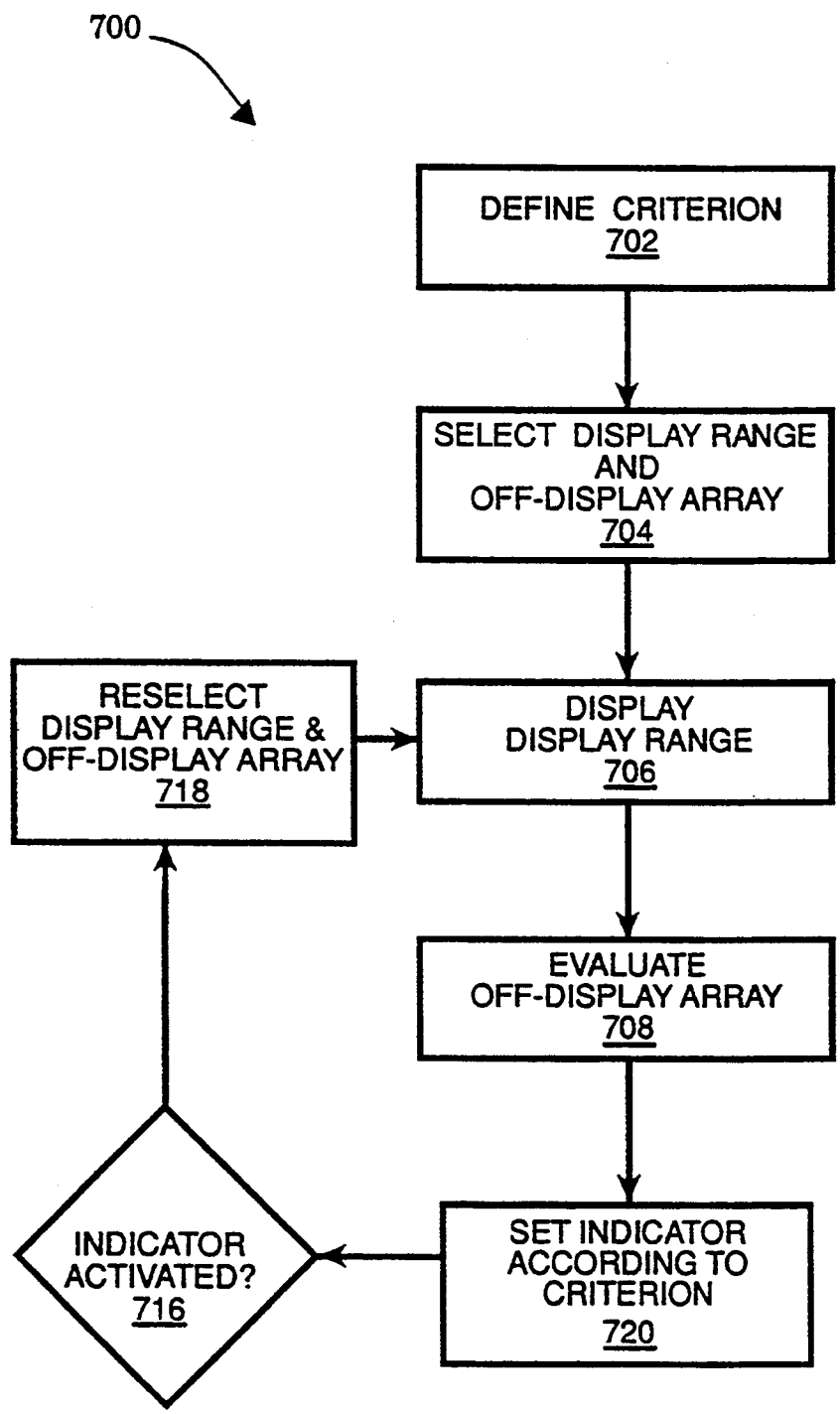
FIG. 7 is an alternative flow chart representation of FIG. 1.

FIG. 7 shows another representation of the method 600. In FIG. 7, after the selected off-display array is evaluated according to the criterion, at 708, the indicator is set, at 720, according to the results of the evaluation.

A user can activate an indicator, e.g., indicator 132, by manipulating mouse 108 until cursor 134, shown in FIG. 1, coincides with the selected indicator; upon coincidence, mouse button 136 is clicked. Activation of the selected indicator causes a new data neighborhood to be displayed. The new neighborhood is the "next" neighborhood that contains a value meeting the criterion for the selected data field in the selected row of the previously unseen data. In the case of indictor 132, the selected unseen data is the array of times after the times currently displayed. In the case of indicator 130, the unseen data is the array of times preceding the currently displayed times. Changing the neighborhood displayed also changes the arrays representing times before or after the displayed times. Therefore, activating an indicator changes both the display range and the off-display array corresponding to an indicator.

In alternative embodiments, the criteria selected can be arbitrary Boolean functions of several data values at one or more times, as for example, the query pulse rate-[i]≧110% pulse rate [i-1]? The criterion can be defined so that evaluation of off-display values involves a comparison with displayed values, as for example, the query Hb[today]/Hb[same time yesterday]≧1.05?The indicator cells can indicate more than one direction for inquiry and for navigation, as for example, Up/Down and Left/Right. The indicator cells can also indicate different criteria, as for example blue left arrows indicating the presence of normal values in cells to the left of the currently displayed neighborhood and red left arrows indicating the presence of abnormal values.

The disclosed system enables the user to go immediately to the location of the data meeting the criterion, and thus to navigate automatically from one data item of interest to another. At the user's selection, the navigation can be either automatic or controlled by the user. In an alternative embodiment, the times (independent variables) can be at regular intervals. In such an embodiment, T$_S$ contains a time for each interval.

There need not be multiple indicators. The invention includes embodiments having only a single indicator. An indicator need not be on-screen and need not be visual. Special keys, for example, can be used to indicate the presence and location of data items of interest, through lights or through a tactile signal. The monitor is not limited to five columns of data, and can include any number of columns and rows convenient to display. The indicator control and selection can be by means other than cursor and mouse. Dedicated keys on a keyboard may be used for data navigation. The method is also compatible with on-line data entries, and is effective with a changing database. The invention includes printouts of the database in which the indicator arrows indicate the presence of values off the current page.

The invention can employ any method for storage of data. For example, a flowsheet can be represented using linked lists, in which no memory is actually devoted to the storage of empty cells. Throughout this application, the word "array" means "ordered set."

The present invention is not limited to flowsheets and spreadsheets. The invention is compatible with any database for which a user wants a guided presentation and indication of items of interest. Any data collection consisting of an array of independent variables and a corresponding array of dependent variables may be efficiently reviewed using the invention. The invention may be used with graphics programs, in which the user navigates from figure to figure, or, for example, with integrated circuit layouts in which the user navigates from component to component. These and other variations upon and modifications to the described embodiments are provided for by the present invention, the scope of which is limited only by the following claims:

What is claimed is:

1. A method for presenting data, said data including values of at least one dependent parameter expressed as a function of an ordered independent parameter, said method comprising the steps of:
   defining at least one criterion for evaluating said values of said dependent parameter;
   selecting values of a first display range of said independent parameter for display;
   selecting a first set of off-display values of said independent parameter, said values of said first display range and said first set of off-display values being mutually exclusive;
   displaying those values of said dependent parameter corresponding to values of said independent parameter within said first display range;
   evaluating values of said dependent parameter corresponding to values of said independent parameter within said first set of off-display values according to said at least one criterion; and
   indicating whether or not said set of off-display values contains at least one value of said dependent parameter determined during said step of evaluating to meet said criterion.

2. A method as recited in claim 1 wherein said indicating step involves displaying an indicator when said set of off-display values contains at least one value of said dependent parameter that meets said criterion.

3. A method as recited in claim 2 further comprising the step of activating said indicator so as to display values of a second display range including at least one value of said dependent parameter meeting said criterion.

4. A method as recited in claim 3 further comprising the step of:
   when said indicator indicates that said set of off-display values contains at least one value of said dependent parameter that meets said criterion, activating said indicator so as to display those values of said dependent parameter corresponding to values of said independent parameter within said second display range selected so that at least one of the displayed values of said dependent parameter meets said criterion.

5. A method as recited in claim 3 wherein said activating step involves not displaying an intermediate range before displaying said second display range, said intermediate range not containing a value of said dependent parameter that meets said criterion, said intermediate range being between said first display range and said second display range.

6. A method as recited in claim 2 wherein said criterion is whether, for said first set of off-display values of said independent parameter, there is at least one corresponding value of said dependent parameter.

7. A method as recited in claim 2 further comprising defining plural criteria for evaluating said values of said dependent variable.

8. A method as recited in claim 7 further comprising the displaying of plural indicators, each indicator corresponding to a respective criterion.

9. A method of presenting data, said data comprising a first set of values of a first dependent parameter as a function of an ordered independent parameter and a second set of values of a second dependent parameter as a function of said independent parameter, said method comprising the steps of:
   defining a first criterion for evaluating said first set of values of said first dependent parameter;
   defining a second criterion for evaluating said second set of values of said second dependent parameter;
   selecting values of a first display range of said independent parameter for display;
   selecting a first set of off-display values of said independent parameter, said values of said first display range and first set of off-display values being mutually exclusive;
   displaying those values of said first and second dependent parameters corresponding to values of said independent parameter within said first display range;
   evaluating the first set of values of said first dependent parameter corresponding to values of said independent parameter within said first set of off-display values according to said first criterion;
   evaluating the second set of values of said second dependent parameter corresponding to values of said independent parameter within said first set of off-display values according to said second criterion;
   indicating whether or not said set of off-display values contains at least one value of said first dependent parameter determined during said step of evaluating the first set of values to meet said first criterion; and
   indicating whether or not said set of off-display values contains at least one value of said second dependent parameter determined during said step of evaluation the second set of values to meet said second criterion.

10. A method as recited in claim 9 further comprising activating a first indicator so as to display a second display range including a succeeding value of said first dependent parameter that meets said first criterion, said indicating steps involving displaying said first indicator when said first set of off-display values contains at least one value of said first dependent parameter that meets said first criterion.

11. A method as recited in claim 9 further comprising activating a second indicator so as to display a third display range including a preceding value of said first dependent parameter that meets said first criterion, said indicating steps involving displaying said second indicator when a second set of off-display values of said independent parameter contains at least one value of said first dependent parameter that meets said first criterion, said second set of off-display value being mutually exclusive with both said first display range and said first set of off-display values.

12. A method as recited in claim 9 further comprising activating a third indicator so as to display a fourth display range including a succeeding value of said second dependent parameter that meets said second criterion, said indicating steps involving displaying said third indicator when said first set of off-display values contains at least one value of said second dependent parameter that meets said second criterion.

13. A method as recited in claim 9 further comprising activating a fourth indicator so as to display a fifth display range including a preceding value of said second dependent parameter that meets said second criterion, said indicating steps involving displaying said fourth indicator when a second set of off-display values of said independent parameter contains at least one value of said second dependent parameter that meets said second criterion, said second set of off-display values being mutually exclusive with both said display range and said first set of off-display values.

14. A system for data presentation comprising: storage means for storing data, said data including values of a dependent parameter expressed as a function of an independent parameter;
   display means for displaying values of said dependent parameter corresponding to values of said independent parameter within a selected range of said independent parameter;
   command input means for receiving commands for selecting said selected range;
   criterion means for defining a criterion to evaluates values of said dependent parameter;
   indicator means for providing a displayable indicator;
   processor means for receiving commands and processing said data accordingly, said processor means being coupled to
   said storage means for accessing said data,
   said command input means for receiving commands to select a first range of values of said independent parameter for display, said processor means accessing the values of said dependent parameter corresponding to the values of said independent parameter within said first range,
   said display means for displaying the values of said dependent parameter corresponding to the values of said independent parameter within said first range,
   said criterion means so that said criterion can be applied to values of said dependent parameter corresponding to values of said independent parameter within a first set of off-display values, said first set of off-display values and said first range of values being mutually exclusive, and said indicator means so that said indicator is displayed only if said criterion is met by at least one value of said dependent parameter corresponding to a value of said independent parameter within said first set of off-display values.

15. A system as recited in claim 14 wherein said processor means further displays values of said dependent parameter corresponding to a second range of said independent parameter, at least one of said values of said dependent parameter corresponding to said second range of said independent variable meeting said criterion.

16. A method for presenting data, said data including values of at least one dependent parameter expressed as a function of an independent parameter, said method comprising the steps of:
   selecting values of a first display range of said independent parameter for display;
   selecting a first set of off-display values of said independent parameter, said values of said first display range and said first set of off-display values being mutually exclusive;
   displaying those values of said dependent parameter corresponding to values of said independent parameter within said first display range;
   determining whether there are non-empty values of said dependent parameter within said set of off-display values of said independent parameter; and
   indicating whether or not said set of off-display values contains at least one value of said dependent parameter determined to be non-empty during said determining step.

17. A method as recited in claim 16 wherein said indicating step involves displaying an indicator.

18. A method as recited in claim 17 further comprising the step of activating said indicator so as to display a second display range including at least one non-empty value of said dependent variable.

* * * * *